US008955369B2

(12) United States Patent
Takagi et al.

(10) Patent No.: US 8,955,369 B2
(45) Date of Patent: Feb. 17, 2015

(54) FUEL VAPOR LEAK DETECTING DEVICE AND FUEL VAPOR LEAK DETECTING METHOD USING THE SAME

(75) Inventors: Kousei Takagi, Nagoya (JP); Mitsuyuki Kobayashi, Gamagori (JP)

(73) Assignee: Denso Corporation, Kariya (JP)

( * ) Notice: Subject to any disclaimer, the term of this patent is extended or adjusted under 35 U.S.C. 154(b) by 218 days.

(21) Appl. No.: 13/616,595

(22) Filed: Sep. 14, 2012

(65) Prior Publication Data

US 2013/0098143 A1 Apr. 25, 2013

(30) Foreign Application Priority Data

Oct. 19, 2011 (JP) ................................ 2011-229708

(51) Int. Cl.
*G01M 3/00* (2006.01)
*F02M 25/08* (2006.01)

(52) U.S. Cl.
CPC ................................ *F02M 25/0818* (2013.01)
USPC .................................... 73/40.5 R; 73/114.39

(58) Field of Classification Search
CPC .. F02D 2250/41; F02D 41/003; F02M 25/08; F02M 25/0836; F02M 25/089; F02M 25/0809; G01M 3/04; G01M 3/26; G01M 3/32; G01M 3/34; F16K 37/0083
USPC ............... 73/114.38, 114.39, 114.77, 114.79; 123/518–521; 138/487.5; 251/129.04
See application file for complete search history.

(56) References Cited

U.S. PATENT DOCUMENTS

| | | | | |
|---|---|---|---|---|
| 4,792,089 | A * | 12/1988 | Ballard | 236/11 |
| 8,701,703 | B2 * | 4/2014 | Scott et al. | 137/487 |
| 2005/0044937 | A1 | 3/2005 | Kobayashi et al. | |
| 2005/0089407 | A1 | 4/2005 | Hosoya | |
| 2007/0189907 | A1 | 8/2007 | Kunihiro et al. | |

FOREIGN PATENT DOCUMENTS

| | | |
|---|---|---|
| JP | 2005-069878 | 3/2005 |
| JP | 2005-098125 | 4/2005 |
| JP | 2005-299444 | 10/2005 |
| JP | 2007-218161 | 8/2007 |

OTHER PUBLICATIONS

U.S. Appl. No. 13/768,646 of Takagi, filed Feb. 15, 2013.

* cited by examiner

*Primary Examiner* — Daniel S Larkin
*Assistant Examiner* — Irving A Campbell
(74) *Attorney, Agent, or Firm* — Nixon & Vanderhye, P.C.

(57) ABSTRACT

A fuel vapor leak detecting device includes a pump, a housing having a pump passage connected to the pump, a switching valve, a pressure detector, and a control device detecting a shutoff pressure that corresponds to an interior pressure of the pump passage detected by the pressure detector when the pump is actuated while the switching valve is closed. The control device controls the switching valve to be opened at least once and to be closed at least once when the shutoff pressure is out of a specified range. The control device detects a fuel vapor leak when the shutoff pressure is in the specified range.

7 Claims, 5 Drawing Sheets

FUEL VAPOR LEAK DETECTING DEVICE AND FUEL VAPOR LEAK DETECTING METHOD USING THE SAME

CROSS-REFERENCE TO RELATED APPLICATION

The application is based on Japanese Patent Application No. 2011-229708 filed Oct. 19, 2011, the disclosure of which is incorporated herein by reference.

TECHNICAL FIELD

The present disclosure relates to a fuel vapor leak detecting device and a fuel vapor leak detecting method using the same.

BACKGROUND

Conventionally, it is known that a fuel vapor leak detecting device detects a fuel vapor leaked from a fuel tank. In JP-2005-69878A (US 2005/0044937), the fuel vapor leak detecting device switches a switching valve so that a tank passage is connected to one of an atmosphere passage and a pump passage and that the tank passage is disconnected from the other of the atmosphere passage and the pump passage. In a case where a vapor pressure of the fuel tank is lowered by driving a pump, if the vapor pressure does not become smaller than a threshold value, it is determined that an amount of a fuel vapor leak is larger than an allowed value.

In JP-2005-69878A, the switching valve has a valve shaft and a valve member opening or closing an end of a passage. The valve member is not integrated with the valve shaft, and is able to incline relative to the valve shaft within a specified angle range so as to reduce dispersions in perpendicularity and coaxiality between the valve member and the valve shaft.

However, in a case where the switching valve is closed, if the valve member is seated on a valve seat in the inclined state relative to the valve shaft, a sealing leak may occur between the valve member and the valve seat. Because a fuel vapor leak is detected based on a pressure detected when the valve member is closed, the fuel vapor leak may not be detected accurately due to the sealing leak.

SUMMARY

According to a first example of the present disclosure, a fuel vapor leak detecting device detecting a fuel vapor leaked from a fuel tank by generating a pressure difference between an interior and an exterior of the fuel tank includes a pump, a housing, a switching valve, a pressure detector and a control device. The housing receives the pump, and has a pump passage, a tank passage and an atmosphere passage. The pump passage has a first end connected with the pump and a second end opposite to the first end. The tank passage has a first end communicating with the fuel tank and a second end connected with the second end of the pump passage. The atmosphere passage has a first end opened to atmosphere and a second end connected with the second end of the tank passage. The switching valve is provided among the pump passage, the atmosphere passage and the tank passage. The switching valve disconnects the tank passage from the pump passage and connects the tank passage to the atmosphere passage when the switching valve is closed. The switching valve connects the tank passage to the pump passage and disconnects the tank passage from the atmosphere passage when the switching valve is opened. The pressure detector is provided in the pump passage, and detects an interior pressure of the pump passage. The control device includes a pump actuator actuating the pump, a switching valve controller switching the switching valve to be closed or opened, and a detecting portion detecting a shutoff pressure that corresponds to the interior pressure of the pump passage detected by the pressure detector when the pump is actuated while the switching valve is closed. The switching valve includes a valve shaft reciprocating in a reciprocating direction, and a valve member that closes the second end of the pump passage. The valve member is able to be inclined with respect to the reciprocating direction within a specified angle range. The control device controls the switching valve to be opened at least once and to be closed at least once via the switching valve controller when the shutoff pressure is out of a specified range. The control device detects the fuel vapor leak when the shutoff pressure is in the specified range.

According to a second example of the present disclosure, a furl vapor leak detecting method using the fuel vapor leak detecting device includes a detecting of the shutoff pressure; a determining whether the shutoff pressure is in the specified range; a conducting of an ON-OFF control by switching the switching valve to be opened at least once and to be closed at least once when the shutoff pressure is out of the specified range; and a conducting of an ON-control by switching the switching valve to be opened when the shutoff pressure is in the specified range. The conducting of the ON-control includes: a detecting of an interior pressure of the fuel tank using the pressure detector after the pump is actuated in the state where the switching valve is opened; a calculating of a second threshold value, that is included in the specified range, based on the shutoff pressure; and a detecting of the fuel vapor leak by comparing the interior pressure of the fuel tank with the second threshold value.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (Embodiment)

A fuel vapor leak detecting device 1 according to an embodiment is used for detecting a fuel vapor leaked from a fuel tank 9 in a fuel vapor treatment apparatus 100.

The fuel vapor treatment apparatus 100 will be described according to FIG. 1.

Figure 1:
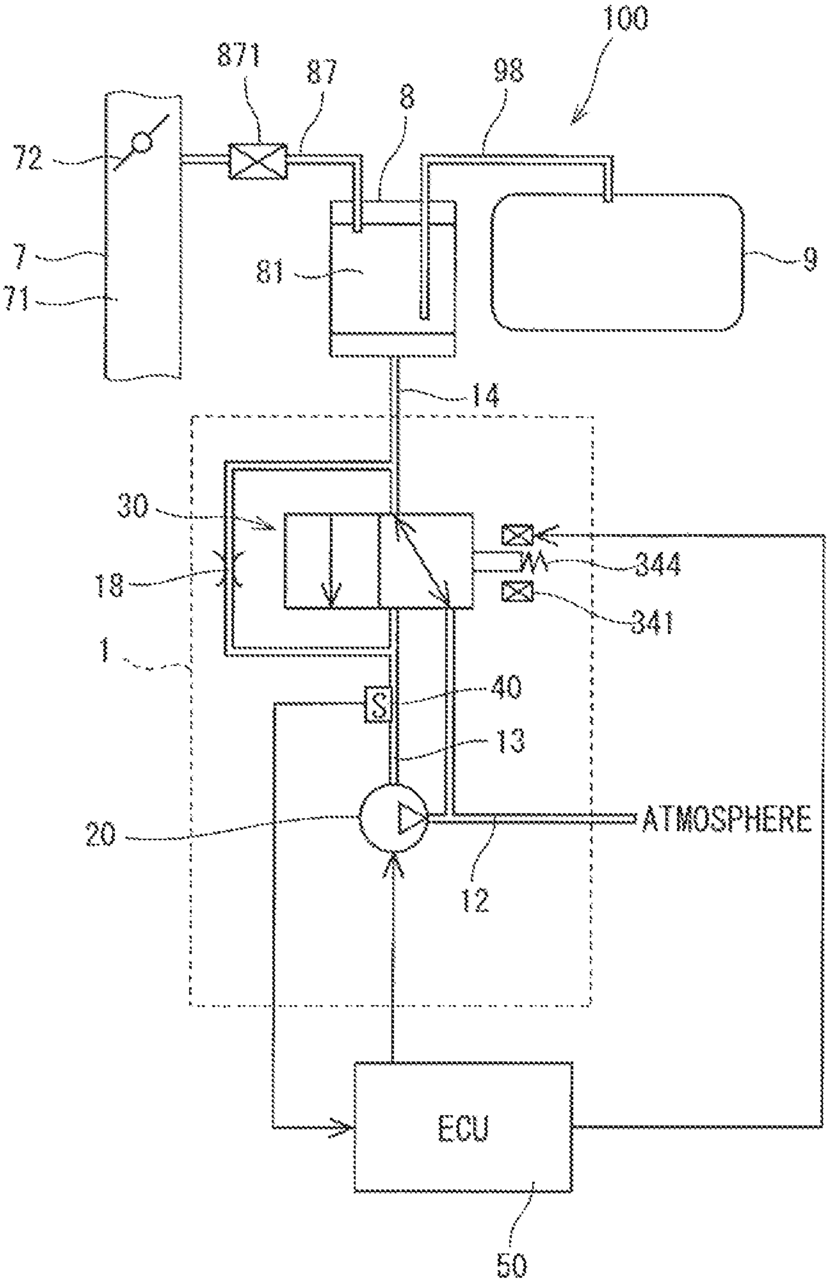
FIG. 1 is a schematic view illustrating a fuel vapor treatment apparatus having a fuel vapor leak detecting device according to an embodiment.

As shown in FIG. 1, the fuel vapor treatment apparatus 100 includes a canister 8 in addition to the fuel tank 9 and the fuel vapor leak detecting device 1. The fuel vapor treatment apparatus 100 collects a fuel vapor occurred in the fuel tank 9 via the canister 8. The fuel vapor treatment apparatus 100 purges the fuel vapor into an intake passage 71 of an intake pipe connected with an engine (not shown).

The fuel tank 9 accumulates a fuel to be supplied into the engine. The fuel tank 9 is connected with the canister 8 via a first purge pipe 98. The first purge pipe 98 is communicated with an interior of the fuel tank 9 and an interior of the canister 8.

The canister 8 includes an adsorption member 81 for collecting the fuel vapor occurred in the fuel tank 9. The canister 8 is connected with the intake pipe 7 via a second purge pipe 87. The second purge pipe 87 is communicated with both the interior of the canister 8 and the intake passage 71 of the intake pipe 7. In the second purge pipe 87, a purge valve 871 is provided. The fuel vapor occurred in the fuel tank 9 is absorbed by the adsorption member 81 of the canister 8 via a passage of the first purge pipe 98. The fuel vapor is purged to downstream of a throttle valve 72 of the intake passage 71 via a passage of the second purge pipe 87. The purge valve 871 may be constructed by an electromagnetic valve. The purge valve 871 adjusts a quantity of the fuel vapor flowing through the passage of the second purge pipe 87.

The fuel vapor leak detecting device 1 will be described according to FIGS. 1 to 3B.

Figure 2:
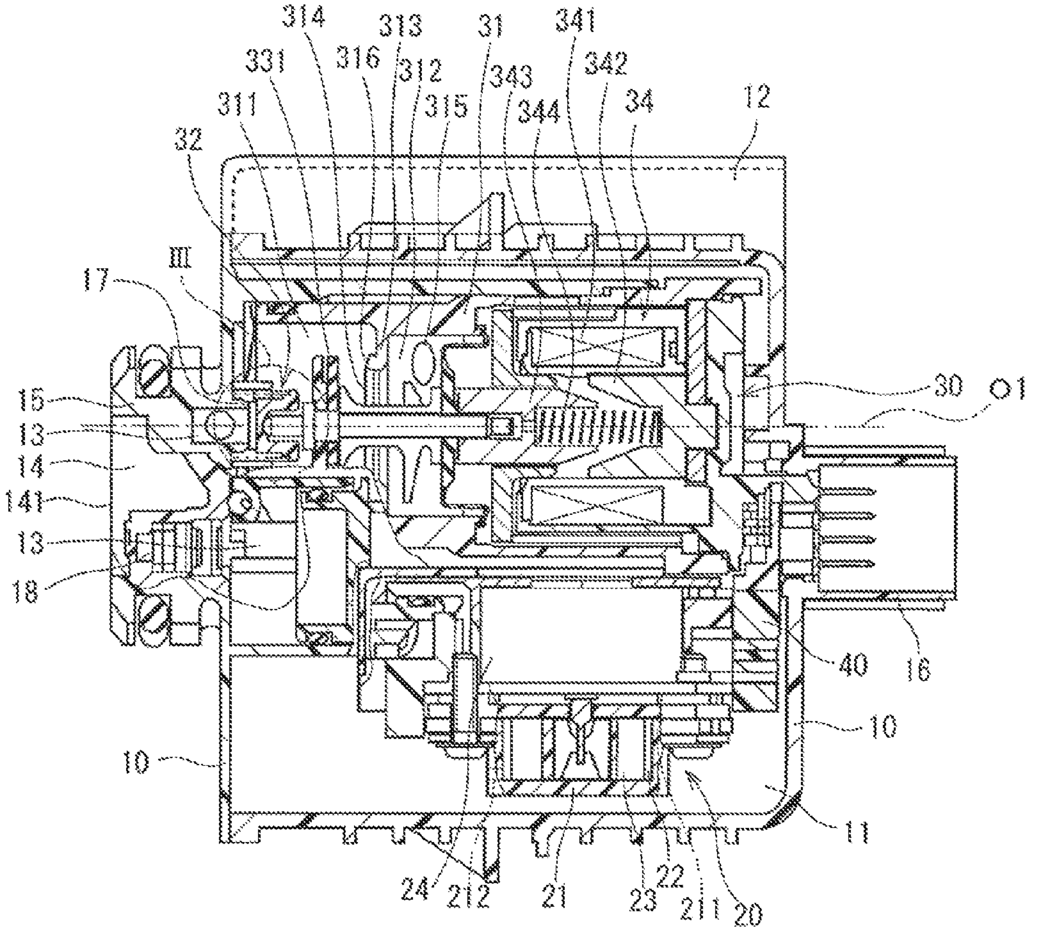
FIG. 2 is a cross-section view illustrating the fuel vapor leak detecting device.

As shown in FIGS. 1 and 2, the fuel vapor leak detecting device 1 includes a housing 10, a pump 20, a switching valve 30, a pressure sensor 40 as a pressure detector and an electric control device (ECU) 50 as a control device. The fuel vapor leak detecting device 1 detects the fuel vapor leaked from the fuel tank 9 and the canister 8 by lowering interior pressures of the fuel tank 9 and the canister 8.

The housing 10 has a substantially rectangular parallelepiped shape made of resin. As shown in FIG. 2, the housing 10 receives the pump 20, the switching valve 30 and the pressure sensor 40. The housing 10 includes a pump receiving chamber 11 and an atmosphere passage 12. The atmosphere passage 12 is communicated with the pump receiving chamber 11 and an exterior of the housing 10. The pump receiving chamber 11 and the atmosphere passage 12 may correspond to an atmosphere passage. Thus, a first end of the atmosphere passage is connected with the exterior of the housing 10, that is, the first end of the atmosphere passage is communicated with the atmosphere.

The housing 10 further includes a pump passage 13 and a canister passage 14. The canister passage 14 may correspond to a tank passage. The pump passage 13 is communicated with the pump receiving chamber 11. A first end of the pump passage 13 is connected with the pump 20. A first end of the canister passage 14 is connected with the fuel tank 9. A second end of the pump passage 13 is communicated with a second end of the canister passage 14 via an orifice 18. The canister passage 14 includes a connection port 141 defined in a canister connection portion 15.

The fuel vapor leak detecting device 1 is connected with the canister 8. The canister passage 14 is communicated with the interior of the canister 8 via the connection port 141. A connector 16 is provided on a side of the housing 10 opposite to the canister connection portion 15. A first valve seat 17 is provided on an end of the pump passage 13 opposite to the pump receiving chamber 11.

The pump 20 is received in the housing 10, and is provided between the pump receiving chamber 11 and the pump passage 13. The pump 20 includes a pump housing 21, a vane 22, a rotor 23 and a motor 24. The pump housing 21 includes an inlet 211 and an outlet 212. The pump 20 is provided so that the inlet 211 is opened on the pump passage 13 and that the outlet 212 is opened on the pump receiving chamber 11. When the rotor 23 is actuated, a gas in the pump housing 21 is ejected from the pump receiving chamber 11 via the outlet 212. Then, a negative pressure is generated in the pump housing 21. Thus, a gas in the pump passage 13 is sucked into the pump housing 21 via the inlet 211. The vane 22 slides along an interior wall of the pump housing 21. The rotor 23 supports the vane 22. The motor 24 actuates the rotor 23. The motor 24 electrically connected with the ECU 50.

The switching valve 30 is received in the housing 10 and is provided to be connected with each of the canister passage 14, the pump passage 13 and the pump receiving chamber 11. The switching valve 30 includes a valve body 31, a first valve member 32, a valve shaft 33 and an electromagnetic actuator 34. The valve shaft 33 includes a second valve member 331. The first valve member 32 may correspond to a valve member.

The valve body 31 has a substantially tubular shape and is provided so that a first end of the valve body 31 corresponds to a second end of the pump passage 13 opposite to the pump 20. In other words, the valve body 31 is provided so that the first end of the valve body 31 corresponds to a position close to the first valve seat 17. A through hole portion 313 is provided at a center portion of the valve body 31 in an axial direction. The through hole portion 313 has a through hole 314. The through hole 314 is provided on a center of the through hole portion 313. The valve body 31 is divided by the through hole portion 313 into a first connection chamber 311 and a second connection chamber 312. The first connection chamber 311 is communicated with the canister passage 14 and is also communicated with the pump passage 13. The second connection chamber 312 is communicated with the pump receiving chamber 11 via a communicating opening 315 opened on the valve body 31. A part of the through hole portion 313 adjacent to the first connection chamber 311 has a second valve seat 316.

Figure 3A:
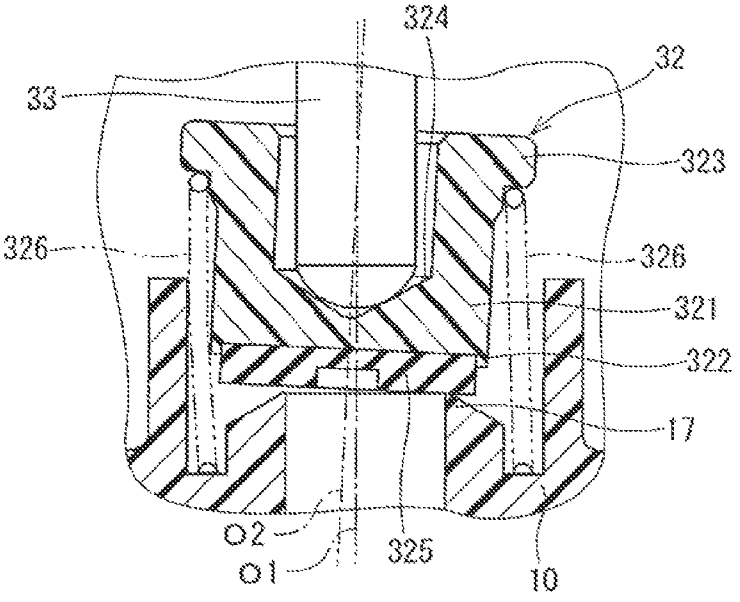
FIG. 3A is an enlarged view of a part III of FIG. 2 illustrating an incomplete closed state of a switching valve of the fuel vapor leak detecting device.
Figure 3B:
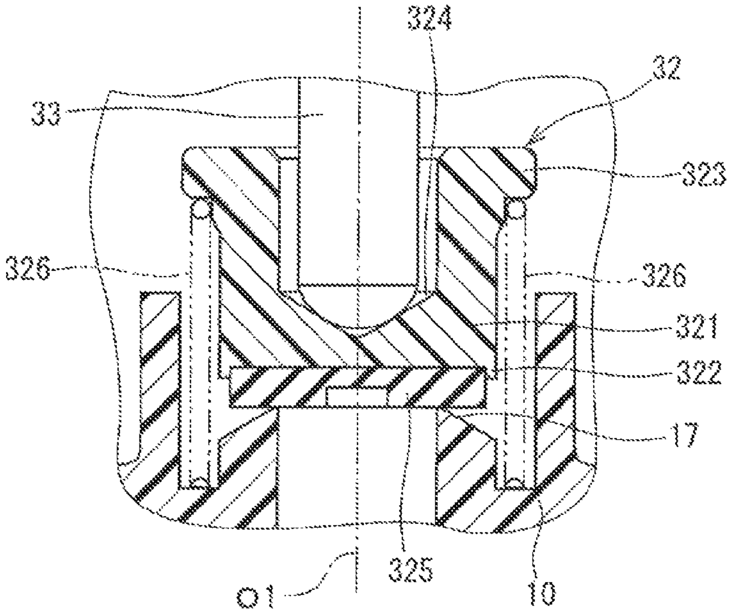
FIG. 3B is an enlarged view of a part III of FIG. 2 illustrating a complete closed state of the switching valve.

As shown in FIGS. 3A and 3B, the first valve member 32 is provided to contact with the first valve seat 17. The first valve member 32 includes a body 321, a tip end portion 322, a flange 323 and a recess 324. The body 321 has a substantially U-shape. The tip end portion 322 is formed on a side of the body 321 opposing to the first valve seat 17. A buffer member 325 is provided between the first valve seat 17 and the tip end portion 322. The tip end portion 322 contacts the first valve seat 17 via the buffer member 325. The flange 323 is formed to project outward in a radial direction from an opposite end of the body 321 opposite to the tip end portion 322. The recess 324 is formed to recess from a center portion of the opposite end of the body 321 toward the tip end portion 322 in the axial direction. A first spring 326 is provided between the flange 323 and an interior wall of the housing 10. The first spring 326 urges the body 321 to a position away from the first valve seat 17 in the axial direction.

The valve shaft 33 is provided in the valve body 31 so that the second valve member 331 is received in the first connection chamber 311. The valve shaft 33 can reciprocate along the axial direction. A first end of the valve shaft 33 is contacted with the a bottom of the recess 324. A second end of the valve shaft 33 opposes to a movable core 343 of the electromagnetic actuator 34.

The electromagnetic actuator 34 is provided on the second end of the valve body 31 in the axial direction. The electromagnetic actuator 34 includes a coil 341, a fixed core 342, the movable core 343 and a second spring 344. The coil 341 is electrically connected with the ECU 50 via the connector 16. The fixed core 342 is fixed on an interior side of the coil 341 in the radial direction. The movable core 343 is provided on the second end of the valve shaft 33. The second spring 344 is provided between the fixed core 342 and the movable core 343. The second spring 344 urges the movable core 343 toward the first valve seat 17. When the coil 341 is energized, a magnetic attraction is generated between the fixed core 342 and the movable core 343. Thus, the movable core 343 moves toward the fixed core 342 along the axial direction with the valve shaft 33.

A first urging force of the first spring 326 is set smaller than a second urging force of the second spring 344. Thus, when the coil 341 is not energized, the second spring 344, urges the body 321 toward the first valve seat 17 via both the movable core 343 and the valve shaft 33. Because the body 321 is seated on the first valve seat 17, the canister passage 14 and the first connection chamber 311 are blocked from the pump passage 13. Further, at this time, because the second valve member 331 is removed from the second valve seat 316, the through hole 314 is released to be open. Thus, the canister passage 14 and the first connection chamber 311 are communicated with the second connection chamber 312, the pump receiving chamber 11 and the atmosphere passage 12 via the through hole 314.

When the coil 341 is not energized, the first valve member 32 is seated on the first valve seat 17, that is, the switching valve 30 is closed to have a closed state (OFF-control). The closed state includes a complete closed state and an incomplete closed state. As shown in FIG. 3B, no gap is generated between the first valve member 32 and the first valve seat 17 in the complete closed state. As shown in FIG. 3A, in the incomplete closed state, the first valve member 32 is seated on the first valve seat 17 with the state where the first valve member 32 is inclined with respect to the valve shaft 33, and a gap is generated between the first valve member 32 and the first valve seat 17.

On the other hand, when the coil 341 is energized, the movable core 343 and the valve shaft 33 are moved toward the fixed core 342 by the magnetic attraction between the fixed core 342 and the movable core 343. Since the body 321 is removed from the first valve seat 17 by the urging force of the first spring 326, the canister passage 14 and the first connection chamber 311 are communicated with the pump passage 13. When the second valve member 331 is seated on the second valve seat 316, the through hole 314 is blocked to close. The canister passage 14 and the first connection chamber 311 are blocked from the second connection chamber 312, the pump receiving chamber 11 and the atmosphere passage 12. When the coil is energized, the first valve member 32 is removed from the first valve seat 17, that is, the switching valve 30 is opened to have an opened state (ON-control).

The pressure sensor 40 is provided in the pump passage 13, and is placed at a side of the housing 10 opposite to the canister connection portion 15. The pressure sensor 40 detects an interior pressure of the pump passage 13. The pressure sensor 40 is electrically connected with the ECU 50 via the connector 16.

The ECU 50 is constructed by a microcomputer including a CPU, a RAM and a ROM. The CPU is a calculator. The RAM and the ROM are memory media. The ECU 50 is electrically connected with the pressure sensor 40, the pump 20 and the electromagnetic actuator 34. Based on a signal according to the interior pressure of the pump passage 13 detected by he pressure sensor 40, the ECU 50 controls the pump 20 by switching the valve 30 to be opened or closed. When the ECU 50 conducts an ON control, the valve 30 is opened. When the ECU 50 conducts an OFF control, the valve 30 is closed. When the ECU 50 conducts an ON-OFF control, the valve 30 is opened, and then closed, at least once.

Figure 4:
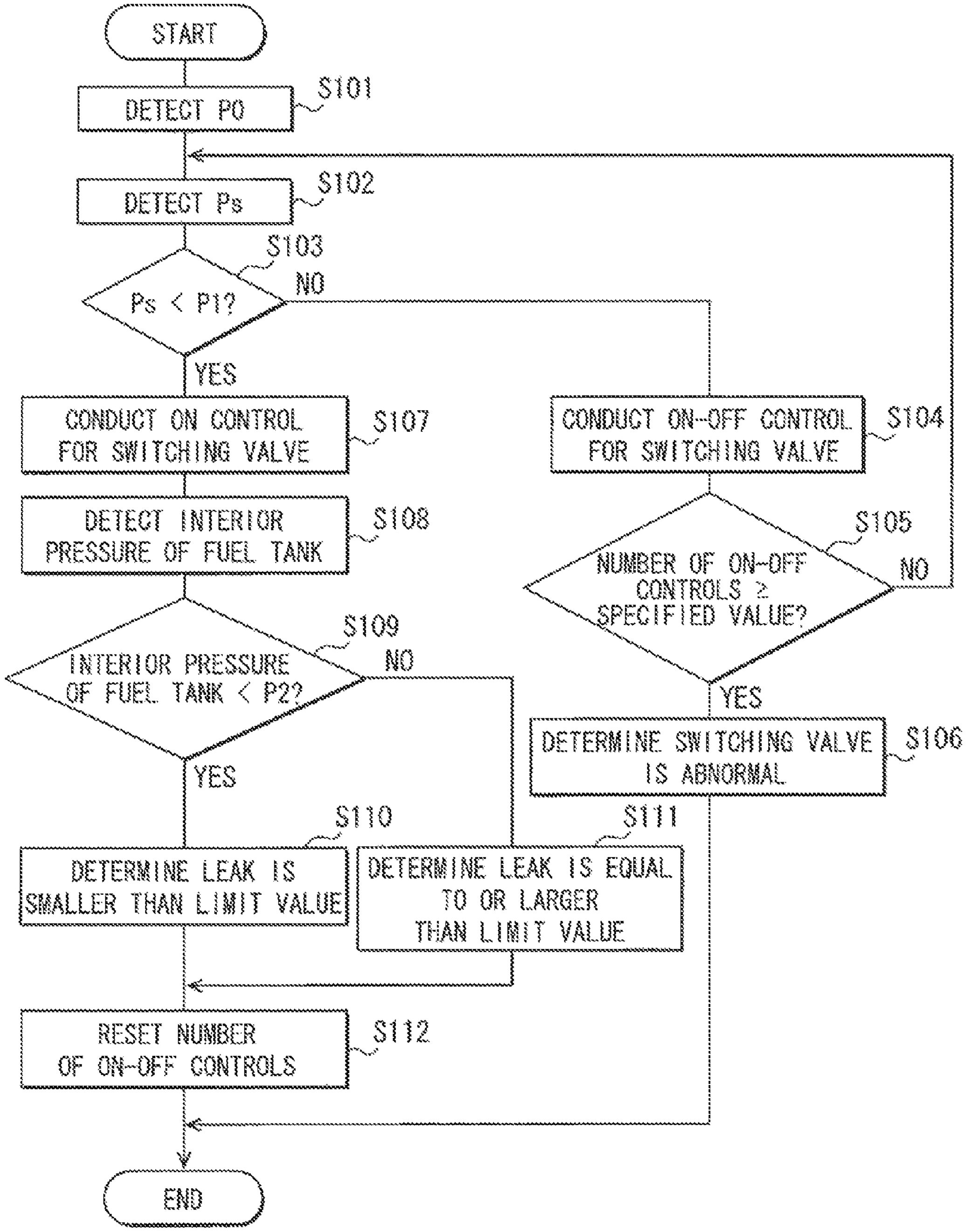
FIG. 4 is a flowchart illustrating a procedure of detecting a vapor leak by the fuel vapor leak detecting device.
Figure 5:
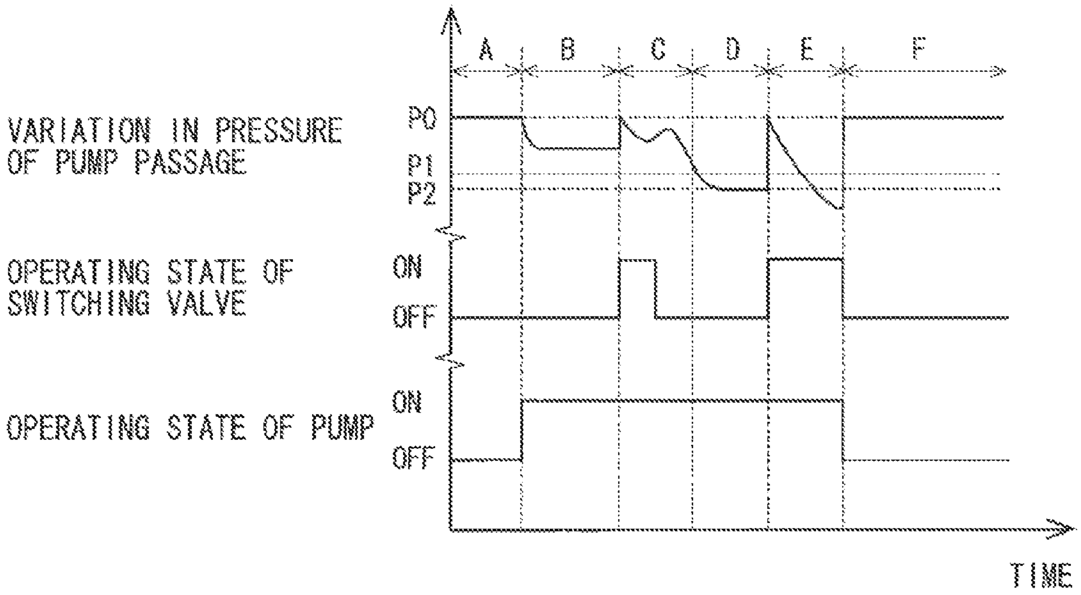
FIG. 5 is a graph illustrating a pressure variation in a pump passage in response to operations of the switching valve and a pump in the fuel vapor leak detecting device.

According to FIGS. 4 and 5, an operation of the fuel vapor leak detecting device 1 will be described. FIG. 4 illustrates a procedure of detecting the fuel vapor leak by the ECU 50. The ECU 50 corresponds to a control device and operates as a pump actuator, a switching valve controller and a shutoff pressure detector. FIG. 5 illustrates an interior pressure variation of the pump passage 13 accompanying with time when the fuel vapor leak is detected.

The procedure shown in FIG. 4 is started when a specified time period is passed after the engine is stopped. The specified period is set to be a period which is necessary to steady a temperature of a vehicle having the engine.

In S101, the ECU 50 detects an atmospheric pressure P0. In a period "A" shown in FIG. 5, both the pump 20 and the switching valve 30 are not energized. In other words, as shown in FIG. 2, the switching valve 30 is at the closed state. The pump passage 13 is communicated with the atmosphere via the interior of the pump 20, the pump receiving chamber 11 and the atmosphere passage 12. Thus, a pressure detected by the pressure sensor 40 can be used as the atmospheric pressure P0. The ECU 50 stores a signal value outputted from the pressure sensor 40 in the RAM as a value corresponding to the atmospheric pressure P0.

In S102, the ECU 50, which may correspond to the pump actuator and the shutoff pressure detector, detects a shutoff pressure Ps. The shutoff pressure Ps is the lowest interior pressure of the pump passage 13 when the pump 20 is actuated and when the switching valve 30 is at the closed state. In this case, the pump passage 13 and the canister passage 14 are not directly communicated with each other, but are communicated with each other via the orifice 18. Thus, the interior pressure of the pump passage 13 is decreased by the pump 20. In a period "B" shown in FIG. 5, the ECU 50 stores a pressure detected by the pressure sensor 40 in the RAM as the shutoff pressure Ps.

In S103, the ECU 50 determines whether the shutoff pressure Ps detected in S102 is smaller than a first threshold value P1. When the shutoff pressure Ps is larger than or equal to the first threshold value P1, the procedure proceeds to S104. A pressure range, which is smaller than the first threshold value P1, may correspond to a specified range. The first threshold value P1 may be set to correspond to properties of the pump 20.

In S104, as the switching valve controller, the ECU 50 conducts the ON-OFF control once relative to the switching valve 30, thereby the ON control is conducted once and the OFF control is conducted once. The ON-control energizes the electromagnetic actuator 34 and the OFF-control stops the energizing of the electromagnetic actuator 34, which are respectively conducted once. In a period "C" shown in FIG. 5, the switching valve 30 is opened (ON-control), and then is closed (OFF-control). The ECU 50 counts a number of times of conducting the ON-OFF control, and stores the number of times in the RAM.

In S105, the ECU 50 determines whether the number of times counted in S104 is larger than a specified number of times. When the number of times in S104 is larger than or equal to the specified number of times, the procedure proceeds to S106. In S106, the ECU 50 determines the switching valve 30 is abnormal.

When the number of times in S104 is smaller than the specified number of times, the procedure returns to S102, and repeats from S102 to S105. When the shutoff pressure Ps is smaller than the first threshold value P1, as shown in a period "D" of FIG. 5, the procedure proceeds to S107.

In S107, the ECU 50 conduct the ON-control relative to the switching valve 30. Thus, since the first valve member 32 is removed from the first valve seat 17, the canister passage 14 and the pump passage 13 are communicated with each other via the first connection chamber 311.

In S108, the ECU 50 detects the interior pressure of the fuel tank 9. When the switching valve 30 is at the opened state in S107, the pump passage 13 is communicated with the fuel tank 9 via the first connection chamber the canister passage 14 and the canister 8. Thus, the interior pressure of the fuel tank 9 is equal to the interior pressure of the pump passage 13. The interior pressure of the pump passage 13 detected by the pressure sensor 40 corresponds to the interior pressure of the fuel tank 9 detected by the pressure sensor 40. When the valve 30 is opened, the interior pressure of the pump passage 13 rises once, in a period "E" shown in FIG. 5, and then the interior pressure of the fuel tank 9 detected by the pressure sensor 40 is decreased accompanying with time by the pump 20.

In S109, the ECU 50 determines whether the interior pressure of the fuel tank 9 is smaller than a second threshold value P2. The second threshold value P2 is calculated by the ECU 50 based on the shutoff pressure Ps. In the present embodiment, the shutoff pressure Ps decreased to be smaller than the first threshold value P1 is used as the second threshold value P2. Accompanying with an operation of the pump 20, when the interior pressure of the fuel tank 9 is smaller than the second threshold value P2, the procedure proceeds to S110. On the other hand, when the interior pressure of the fuel tank 9 is larger than or equal to the second threshold value P2, the procedure proceeds to S111.

In S110, the ECU 50 determines an amount of the fuel vapor leak in the fuel tank 9 is smaller than an allowed value (limit value). When the interior pressure of the fuel tank 9 is decreased to be smaller than the second threshold value P2, there is no intake air from an exterior of the fuel tank 9 to the interior of the fuel tank 9, that is, an air-tightness of the fuel tank 9 is completely achieved. Thus, no fuel vapor is released from the interior of the fuel tank to the exterior of the fuel tank 9, and it can be determined that the amount of the fuel vapor leak is smaller than the allowed value.

In S111, the ECU 50 determines the amount of the fuel vapor leak in the fuel tank 9 is larger than or equal to the allowed value. When the interior pressure of the fuel tank 9 is not decreased to be smaller than the second threshold value P2, there is an intake air from the exterior of the fuel tank 9 accompanying with decreasing in the interior pressure of the fuel tank 9. Thereby, when the fuel vapor is occurred at the interior of the fuel tank 9, it is likely the fuel vapor is released from the interior of the fuel tank 9 to the exterior of the fuel tank 9. Therefore, when the interior pressure of the fuel tank 9 is not decreased to be lower than the second threshold value P2, it can be determined the amount of the fuel vapor leak is larger than or equal to the allowed value. Since the amount of the fuel vapor leak is determined to be larger than the allowed value, the ECU 50 lights a warning lamp on a dashboard at the next operation of the engine. Then, the driver is warned that the fuel vapor leak is occurred.

When the interior pressure of the fuel tank 9 is substantially equal to the second threshold value P2, a crack corresponding to the orifice 18 is occurred in the fuel tank 9.

In S112, the ECU 50 resets the number of times of conducting the ON-OFF control stored in the RAM.

When a detection of the fuel vapor leak is finished, the ECU 50 terminates the energization of both the pump 20 and the switching valve 30, in a period "F" shown in FIG. 5. When the energization of both the pump 20 and the switching valve 30 is terminated, the leak detection is ended. Thereby, as the period "F" shown in FIG. 5, the pressure of the pump passage is returned to the atmosphere pressure P0. After confirming that the pressure of the pump passage 13 is returned to the atmosphere pressure P0, the ECU 50 terminates the operation of the pressure sensor 40 and the detection of the furl vapor leak.

According to the embodiment, the ECU 50 conducts the ON-OFF control relative to the valve 30 when the shutoff pressure Ps does not decrease to be lower than the first threshold value P1. Specifically, as shown in FIG. 3A, when the valve member 32 is seated on the valve seat 17 in the state where a central axis O2 of the first valve member 32 inclines to a central axis O1 of the valve shaft 33, the ECU 50 conducts the ON-OFF control. Thus, the first valve member 32 is reciprocated in the axial direction. Then, as shown in FIG. 3B, the central axis O2 of the first valve member 32 agrees with the central axis O1 of the valve shaft 33. Therefore, a seal leak between the first valve member 32 and the first valve seat 17 can be restricted, and the shutoff pressure Ps can be decreased to be smaller than the first threshold value P1. As a result, the second threshold value P2 is restricted from being incorrectly calculated, and an incorrect-detection of the fuel vapor leak can be restricted.

Further, when the ON-OFF control is conducted, the first valve member 32 and the second valve member 331 are reciprocated. Then, impurities accumulated between the first valve member 32 and the first valve seat 17 or between the second valve member 331 and the second valve seat 316 can be removed. Therefore, the seal leak by the impurities can be restricted.

Moreover, when the central axis O2 of the first valve member 32 does not agree with the central axis O1 of the valve shaft 33 even though the ON-OFF control is conducted a specified number of times, the switching valve 30 is determined to be abnormal. Therefore, an abnormality of the switching valve 30, which cannot be corrected by the ON-OFF control, can be detected.

(Other Embodiment)

According to the embodiment above, the fuel vapor leak of both the fuel tank and the canister is detected by decreasing the interior pressure of both the fuel tank and the canister. When the shutoff pressure is larger than the first threshold value, the ECU controls the switching valve to have each of the opened state and the closed state for several times. In addition, the shutoff pressure decreased to be smaller than the first threshold value is used as the second threshold value.

On the other hand, in other embodiment, the fuel vapor leak of the fuel tank may be detected by increasing the interior pressure of the fuel tank. In such a case, when the shutoff pressure is smaller than the first threshold value, the ECU controls the switching valve to have each of the opened state and the closed state for several times. In addition, the shutoff pressure increased larger than the first threshold value is used as the second threshold value.

According to the embodiment above, the shutoff pressure decreased to be smaller than the first threshold value is used as the second threshold value.

On the other hand, in other embodiment, the second threshold value may be calculated based on the shutoff pressure decreased to be smaller than the first threshold value. Further, the second threshold value may be calculated based on the shutoff pressure increased to be larger than the first threshold value.

According to the embodiment above, in the ON-OFF control, the ON-control energizing the electromagnetic actuator of the switching valve and the OFF-control terminating the energizing of the electromagnetic actuator of the switching valve are respectively conducted once.

On the other hand, in other embodiment, in the ON-OFF control, the ON-control and the OFF-control may be respectively conducted for several times.

Such changes and modifications are to be understood as being within the scope of the present disclosure as defined by the appended claims.

What is claimed is:

1. A fuel vapor leak detecting device detecting a fuel vapor leaked from a fuel tank by generating a pressure difference between an interior and an exterior of the fuel tank, the fuel vapor leak detecting device comprising:

a pump;

a housing receiving the pump, the housing having:

a pump passage having a first end connected with the pump and a second end, a tank passage having a first end communicating with the fuel tank and a second end connected with the second end of the pump passage, and an atmosphere passage having a first end opened to atmosphere and a second end connected with the second end of the tank passage;

a switching valve provided among the pump passage, the atmosphere passage and the tank passage, the switching valve disconnecting the tank passage from the pump passage and connecting the tank passage to the atmosphere passage when the switching valve is closed, the switching valve connecting the tank passage to the pump passage and disconnecting the tank passage from the atmosphere passage when the switching valve is opened;

a pressure detector provided in the pump passage, the pressure detector detecting an interior pressure of the pump passage; and a control device including a pump actuator actuating the pump, a switching valve controller conducting an ON control to open the switching valve and an OFF control to close the switching valve, and a detecting portion detecting a shutoff pressure that corresponds to the interior pressure of the pump passage detected by the pressure detector when the pump is actuated while the switching valve is closed, and a storage portion storing a number of times of conducting the ON control and the OFF control, wherein the switching valve includes a valve shaft reciprocating in a reciprocating direction, and a valve member that closes the second end of the pump passage, the valve member being inclined with respect to the reciprocating direction within a specified angle range;

the switching valve controller conducts the ON control and the OFF control at least once when the shutoff pressure is out of a specified range;

the control device detects the fuel vapor leak when the shutoff pressure is in the specified range; and the switching valve controller conducts the ON control and the OFF control at least a specified number of times based on the number of times stored in the storage portion when the shutoff pressure is out of the specified range.

2. The fuel vapor leak detecting device according to claim 1 detects the fuel vapor leak by lowering an interior pressure of the fuel tank, wherein the switching valve controller of the control device conducts the ON control and the OFF control at least once when the shutoff pressure is larger than a first threshold value.

3. A fuel vapor leak detecting method using the fuel vapor leak detecting device according to claim 1, the method comprising:

detecting the shutoff pressure;

determining whether the shutoff pressure is in the specified range;

conducting the ON control and the OFF control at least once when the shutoff pressure is out of the specified range; and dectecting the vapor leak when the shutoff pressure is in the specified range, wherein the detecting the fuel vapor leak includes:

conducting the ON control;

detecting an interior pressure of the fuel tank using the pressure detector after the pump is actuated in the state where the switching valve is opened;

calculating a second threshold value, that is included in the specified range, based on the shutoff pressure; and detecting the fuel vapor leak by comparing the interior pressure of the fuel tank with the second threshold value.

4. The fuel vapor leak detecting device according to claim 1, wherein the control device further includes a counting portion counting the number of times of conducting the ON control and the OFF control when the shutoff pressure is out of the specified range.

5. The fuel vapor leak detecting device according to claim 1, wherein the control device further includes a number determining portion determining whether the number of times is larger than or equal to the specified number of times when the shutoff pressure is out of the specified range, and the control device determines that the switching valve is abnormal when the number determining portion determines that the number of times is larger than or equal to the specified number of times.

6. The fuel vapor leak detecting device according to claim 1, wherein the control device further includes a resetting portion resetting the number of times of conducting the ON control and the OFF control stored in the storage portion when the shutoff pressure is in the specified range.

7. The fuel vapor leak detecting device according to claim 1, wherein the control device further includes a shutoff-pressure determining portion determining whether the shutoff pressure is smaller than a threshold value, the control device determines that the shutoff pressure is in the specified range when the shutoff-pressure determining portion determines that the shutoff pressure is smaller than the threshold value, and the control device determines that the shutoff pressure is out of the specified range when the shutoff-pressure determining portion determines that the shutoff pressure is not smaller than the threshold value.

* * * * *